United States Patent [19]

Shirley

[11] Patent Number: 5,048,464
[45] Date of Patent: Sep. 17, 1991

[54] SELF CLEANING LITTER SYSTEM

[76] Inventor: Kirk B. Shirley, 2705 Bay Meadow Cir., Dallas, Tex. 75234

[21] Appl. No.: 575,959

[22] Filed: Aug. 31, 1990

[51] Int. Cl.$^5$ .......................... A01K 1/01; B07B 1/00
[52] U.S. Cl. ................................... 119/166; 209/235; 209/362
[58] Field of Search ....................... 119/166, 161–170; 209/235, 362, 350, 374

[56] References Cited

U.S. PATENT DOCUMENTS

| 4,190,525 | 2/1980 | Menzel | 209/235 |
| 4,574,735 | 3/1986 | Hohenstein | 119/161 |
| 4,846,104 | 7/1989 | Pierson | 209/235 |
| 4,854,267 | 8/1989 | Morrow | 119/161 |

FOREIGN PATENT DOCUMENTS 297015A 6/1988 European Pat. Off. ............ 119/166

Primary Examiner—John G. Weiss
Attorney, Agent, or Firm—Ross, Howison, Clapp & Korn

[57] ABSTRACT

A litter system includes a chamber for containing a quantity of particulate litter. The chamber includes front and rear walls, the front wall thereof including an aperture providing an entry way to the chamber for an animal. A helical shaped screen is disposed within the chamber and extends from adjacent the front end to adjacent the rear end of the chamber for separating the litter from animal waste and for transporting the animal waste through the chamber. Structure is provided for rotating the chamber, such that animal waste is transported through the chamber as the chamber rotates.

19 Claims, 3 Drawing Sheets

SELF CLEANING LITTER SYSTEM

TECHNICAL FIELD OF THE INVENTION

This invention relates to litter boxes, and more particularly to an improved mechanism for automatically self cleaning a litter box.

BACKGROUND OF THE INVENTION

Heretofore, a number of improvements for cat litter box mechanisms have been proposed. However, such mechanisms have been ineffective or overly mechanized. These litter boxes have required special supplies, special installation requirements, or extensive operator intervention in order to clean a litter box and have not been fully automatic in operation.

A need has thus arisen for a practical mechanism suitable for automatically eliminating the wastes of animals, such as for example, cats that can be used in a home environment without the need for special installation or special supplies. Such a self cleaning litter box requires good reliability, reduced costs of operation and efficient use of litter. Additionally, a need has arisen for a litter receptacle for receiving animal waste, automatically separating the waste from litter, and depositing the waste in a disposable waste bag. A need has still further arisen for an automatic litter system which requires essentially no attention during normal operation except for the periodic changing of soiled litter and the changing of a waste disposal bag.

SUMMARY OF THE INVENTION

In accordance with the present invention, a litter system is provided, and includes a chamber for containing a quantity of particulate litter. The chamber includes front and rear walls, the front wall thereof includes an aperture providing an entry way to the chamber for an animal. A helical shaped screen is disposed within the chamber and extends from adjacent the front end to adjacent the rear end of the chamber for separating the litter from animal waste and for transporting the animal waste through the chamber. Structure is provided for rotating the chamber, such that animal waste is transported through the chamber as the chamber rotates.

In accordance with another aspect of the present invention, a litter system is provided, and includes a cylindrical chamber having first and second ends and a sidewall for containing a quantity of particulate litter. The chamber includes a front wall and a rear wall, corresponding to the first and second ends, respectively. The chamber front wall includes an aperture providing an entry way to the chamber for an animal. The chamber rear wall includes a centrally disposed aperture. A helical shaped screen having first and second ends is disposed within the chamber and adjacent to the side wall. The first end of the screen is disposed adjacent to the front wall and the second end of the screen is disposed adjacent the rear wall for separating the litter from animal waste and for transporting the animal waste through the chamber. Structure is disposed between the second end of the screen and the rear wall aperture for lifting the animal waste from the helical shaped screen through the rear wall aperture. Structure is further provided for rotating the chamber, such that animal waste is transported through the chamber as the chamber rotates.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
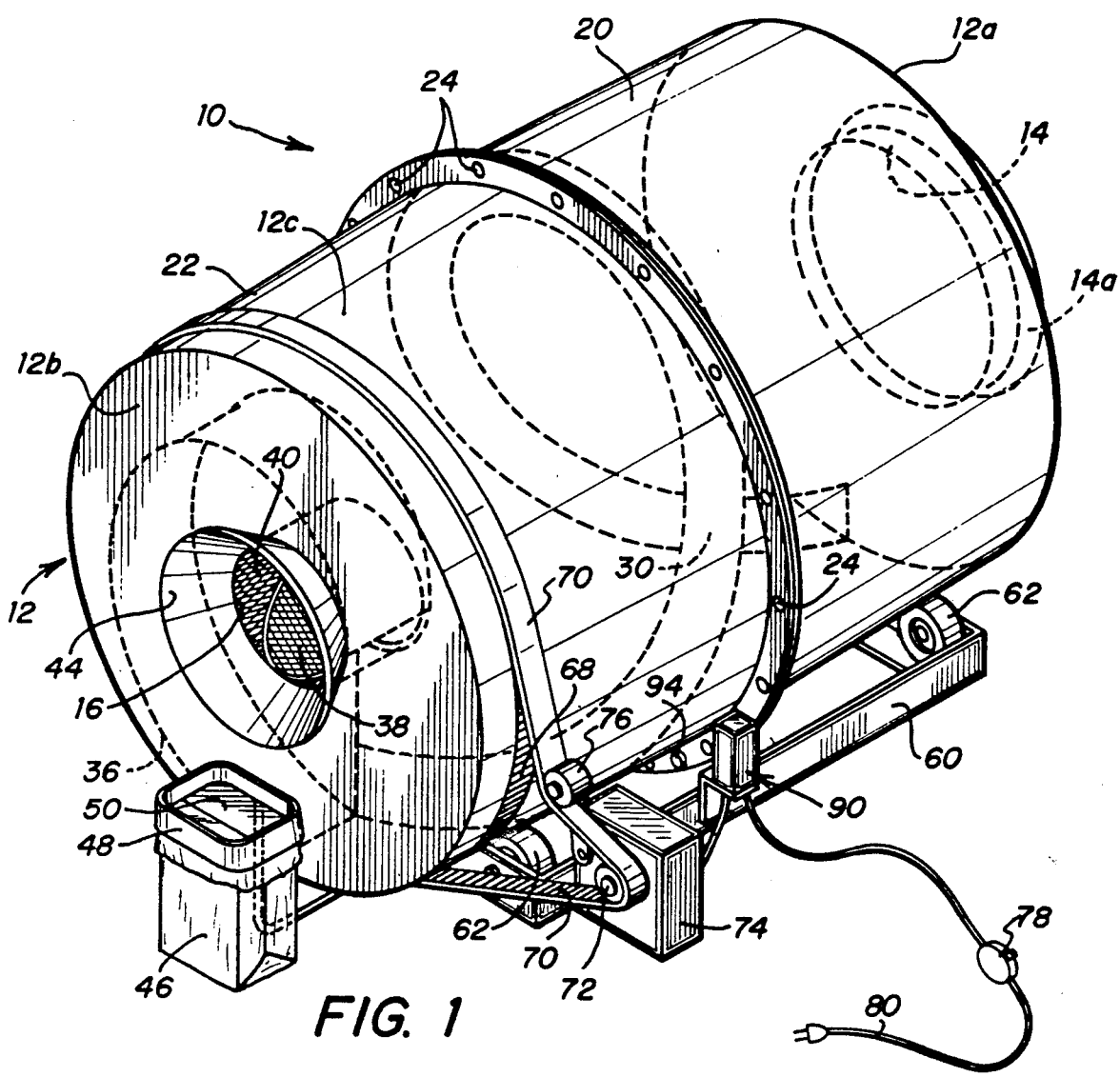
FIG. 1 is a isometric view of the present self cleaning litter system.
Figure 2:
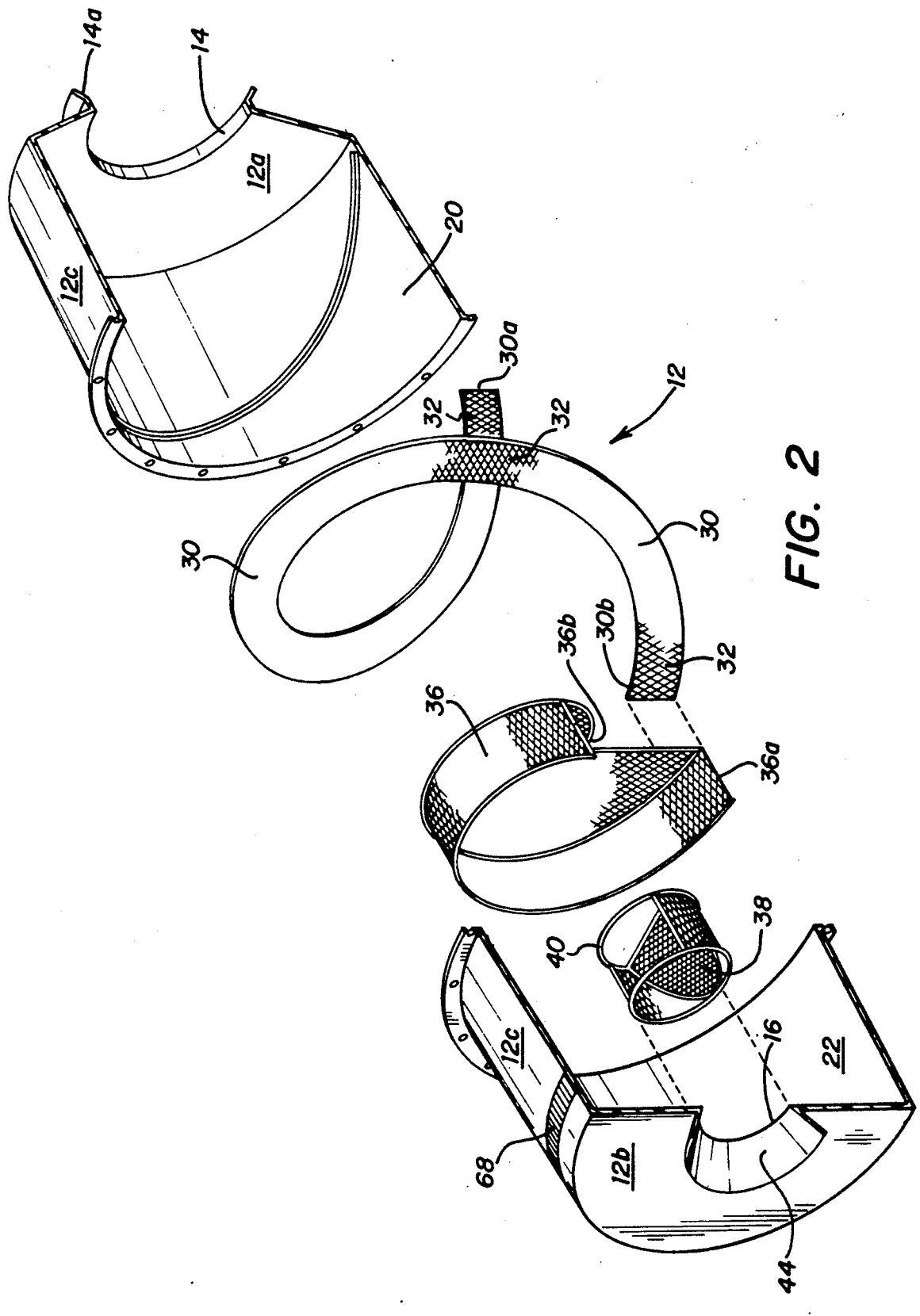
FIG. 2 is an exploded partial section view of the chamber illustrated in FIG. 1.

Referring simultaneously to FIGS. 1 and 2, the present self cleaning litter system is illustrated, and is generally identified by the numeral 10. Self cleaning litter system 10 includes a cylindrical chamber generally identified by the numeral 12 having a front wall 12a, rear wall 12b, and side wall 12c. Front wall 12a is funnel shaped and includes an aperture 14 for providing an entry way to chamber 12 for an animal such as, for example, a cat. Circumferentially disposed around aperture 14 and extending from front wall 12a is a lip 14a.

Rear wall 12b includes an aperture 16 through which animal waste if discharged from cylinder 12 through operation of the present invention. Cylinder 12 contains a bed of particulate litter (not shown) which receives the animal waste. The present self cleaning litter system 10 functions to separate the animal waste from the litter while simultaneously transporting the animal waste through cylinder 12 for discharge through aperture 16 of rear wall 12b of cylinder 12.

Cylinder 12 may be fabricated from, for example, two half sections 20 and 22 which are interconnected utilizing fasteners 24 which may comprise, for example, rivets or bolts.

An important aspect of the present invention is the use of a helical shaped screen or sifter 30 having ends 30a and 30b, which is centrally disposed within chamber 12 along side wall 12c, and which extends from adjacent front wall 12a to rear wall 12b of chamber 12. Screen 30 includes a plurality of apertures 32 which are sized to allow particular litter to be passed through screen 30 while lifting and separating the animal waste from the particulate litter. Through rotation of cylinder 12, screen 30 transports the animal litter through cylinder 12 for discharge through aperture 16 within rear wall 12b of cylinder 12. Disposed adjacent to rear wall 12b and end 30b of screen 30 is a lifting device 36 which is centrally disposed within cylinder 12 and adjacent to rear wall 12b. Lifting device 36 includes ends 36a and 36b and a plurality of apertures 36c. End 36b is aligned with a funnel shaped tilting shelf 38 contained within a cylinder 40 which is mounted within cylinder 12 in alignment with aperture 16. Animal waste received within screen 30 is transported to lifting device 36 at ends 36a, and through rotation of cylinder 12, the waste is transported to end 36b of lifting device 36 for deposit onto tilting shelf 38 for discharge through aperture 16.

Animal waste discharge through aperture 16 of rear wall 12b is directed through the use of a funnel 44 extending from rear wall 12b. Animal waste is directed via funnel 44 to a disposable bag 46 mounted within a frame 48 disposed adjacent to rear wall 12b of cylinder 12. Frame 48 includes a normally closed cover 50 for closing disposable bag 46. Cover 50 is pivotally opened through the weight of animal waste passing through aperture 16 of rear wall 12, and is biased to close after animal waste has passed through cover 50. In this manner, the animal waste is automatically contained within disposable bag 46, and cover 50 is automatically closed to retain odors and prevent spillage through the automatic operation of cover 50.

Cylinder 12 is rotatable in operation for the sifting and transportation of animal waste through cylinder 12. Cylinder 12 is mounted in a frame 60 to which is mounted idler wheels 62 which engage side wall 12c of cylinder 12. Circumferentially disposed around side wall 12c of cylinder 12 are teeth 68 which engage a timing belt 70. Timing belt 70 engages a motor sprocket 72 which is driven by a motor 74. A belt tensioner 76 is provided to assure that timing belt 70 does not slip on motor sprocket 72. Power to motor 74 is provided through a switch 78 disposed within a power supply line 80 which is interconnected to a power source.

In operation, switch 78 is manually actuated. Preferably, self cleaning litter system 10 may be operated once a day, as to allow the animal waste to dry out and facilitate its removal. As cylinder 12 rotates through operation of motor 74 and timing belt 70, cylinder 12, resting upon idler wheels 62, rotates about its center causing the litter and animal waste to be lifted through due to the helical shape of screen 30. As the litter and animal waste are lifted, the litter falls through apertures 32 within screen 30, leaving the animal waste behind and on top of screen 30. The tilt of screen 30 causes the animal waste to tumble toward the rear wall 12b of cylinder 12.

As the animal waste tumbles to the rear of cylinder 12, the animal waste falls into end 36a of lifting device 36. End 36a scoops up the animal waste and litter such that the apertures 36c of lifting device 36 proceed to separate animal waste from the litter by allowing the litter to fall through apertures 36c. As the animal waste tumbles through lifting device 36, the animal waste is lifted towards the center as lifting device 36 which spirals inward toward the center of barrel 12.

As the animal waste arrives at the center of lifting device 36, the waste falls on tilting shelf 38 which tilts toward aperture 16 of rear wall 12b. The animal waste continues tumbling off of tilting shelf 38 and falls through funnel 44 onto cover 50 of disposable back 46.

Figure 3:
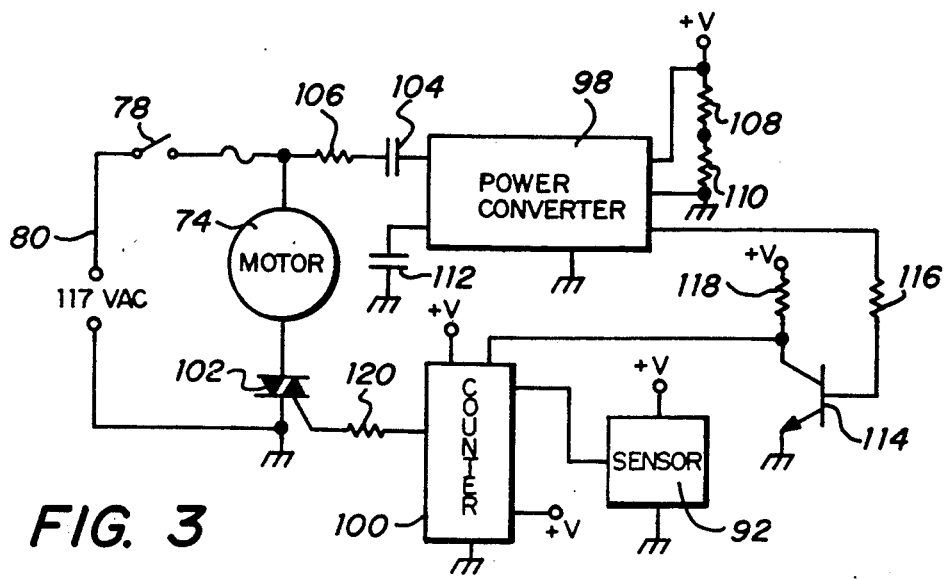
FIG. 3 is an electrical block diagram illustrating the control circuitry for control of chamber rotation.

Referring simultaneously to FIGS. 1 and 3, rotational control of cylinder 12 is provided through the use of a controller 90 which includes, for example, a Hall-effect sensor 92 for sensing the rotation of cylinder 12 based upon the position of a magnet 94 mounted to sidewall 12c of cylinder 12. When motor 74 is energized through operation of switch 78, a power converter 98 generates a power-on reset signal which forces a counter 100 into a 0 state and causes the counter divide-by-10 function to go high. Counter 100 is clocked by the output of sensor 92, which is triggered by sensing magnet 94 as cylinder 12 rotates. Power converter 98 comprises, for example, an AC-DC monolithic power converter such as, for example, a Maximum MAX 611, which converts line voltage directly to a usable 9 volt source and allows the control of a triac 102. Interconnected to power converter 98 is a capacitor 104 and resistor 106 utilized for current limiting. Resistors 108 and 110 connected to power converter 98 function as a voltage divider to set the output voltage of power converter 98 to, for example, 9 volts. A capacitor 112 interconnected to power converter 98 functions for lengthening the reset pulse of counter 100, in order to ensure that magnet 94 positioned on side wall 12c of cylinder 12 has traveled sufficiently past sensor 92 to prevent sensor 92 from generating a false count.

Counter 100 is interconnected to a transistor 114 whose base is interconnected to power converter 98 through a resistor 116. Transistor 114 is also interconnected to a resistor 118. Resistors 116 and 118 and transistor 114 comprise a discrete logic inverter to provide counter 100 the correct polarity of reset pulse.

In operation, sensor 92 which may comprise, for example, a Spraigue UGN-3013T, senses the rotation of cylinder 12 when magnet 92 rotates into close proximity to controller 90. Each time magnet 94 sweeps by sensor 92, sensor 92 generates a clock pulse that causes counter 100 to advance. The output of counter 100 remains at a high state until the sensor 92 clocks counter 100, for example ten times. The high output from counter 100 triggers, through a resistor 120, triac 102 into conduction. When triac 102 is on, current is conducted to motor 74. Once counter 100 has reached, for example, ten counts, counter 100 changes to a low state, which in turn causes triac 102 to turn off, thereby ceasing to conduct current to motor 74, causing motor 74 to turn off, thereby terminating rotation of cylinder 12.

Since sensor 92 is mounted to frame 60, in an 8 o'clock position with respect to front wall 12a of cylinder 12, cylinder 12 stops just past the resting position of the particulate litter disposed within cylinder 12. Stoppage of rotation of cylinder 12 is done to compensate for the reverse rotation caused by the weight of the particulate litter. This reverse rotation is beneficial because it causes the leveling out of the litter within the bed. Further, magnet 94 and sensor 72 are positioned as to prevent helical screen 30 from remaining in the particulate litter bed in the off position, thereby preventing screen 30 from becoming soiled and not in the path of animals entering cylinder 12.

In order to remove soiled particulate litter from cylinder 12, a disposable garbage bag may be attached to front wall 12a via lip 14a disposed around aperture 14. The bag may be secured to lip 14a using a bag with drawstrings or by an elastomeric member. Cylinder 12 is lifted from frame 60 with aperture 14 tilted downwardly such that the litter falls into the disposable bag aided by the funnel shape of front wall 12a of cylinder 12.

Figure 4:
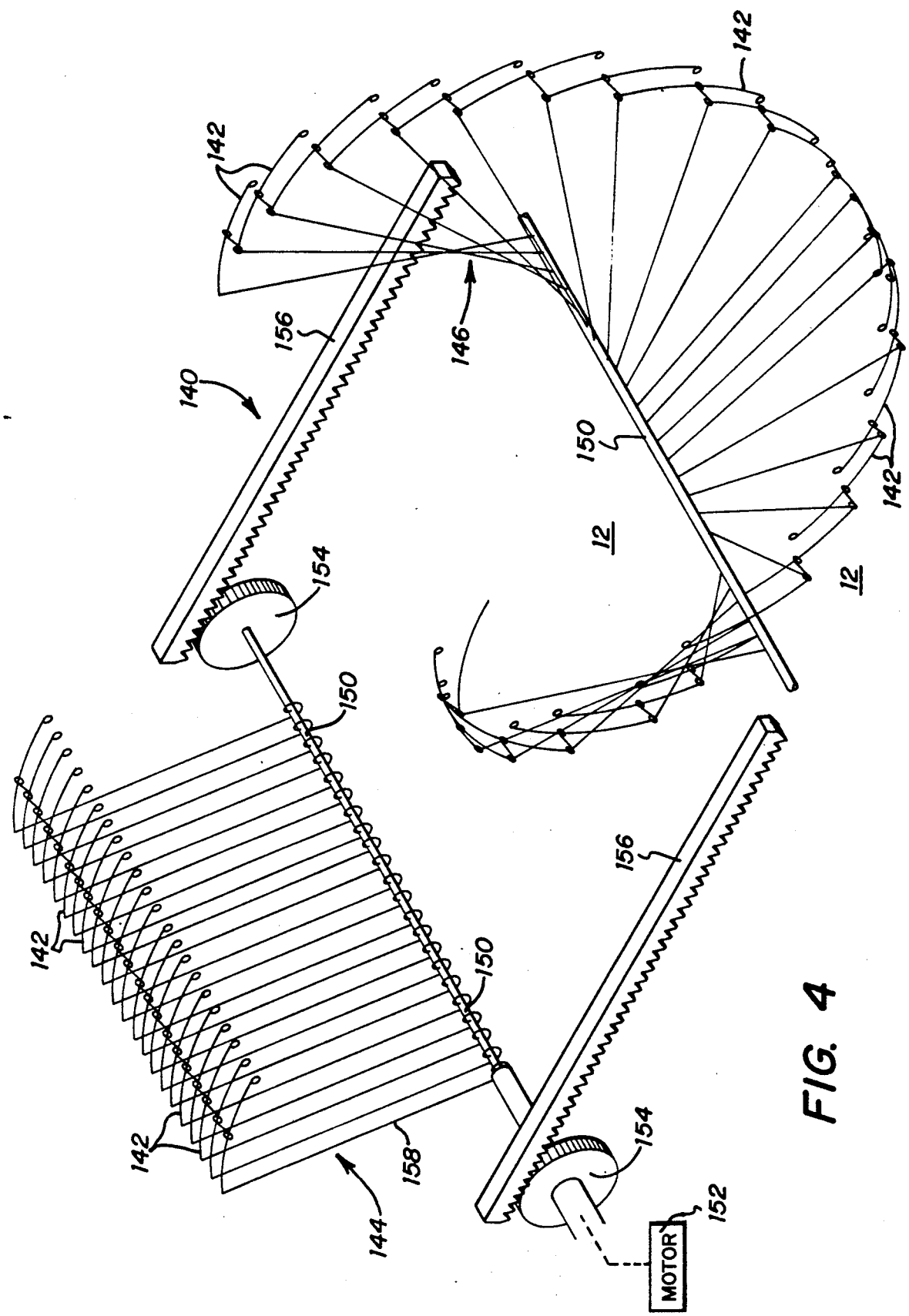
FIG. 4 is a isometric view of a second embodiment of the present self cleaning litter system.

Referring now to FIG. 4, a second embodiment of the present self cleaning litter system is illustrated, and is generally identified by the numeral 140. Self cleaning litter system 140 includes a plurality of interconnected discrete segments 142 which are disposed within cylinder 12 in place of screen 30. Segments 142 move from a stowed position 144 to a spiraled open position at 146, such that segments 142 form a spiral that is unfolded as segments 142 travel through cylinder 12. As the particulate litter is scooped up by segments 142 the animal waste is separated from the particulate litter and propelled back toward rear wall 12b of cylinder 12. The animal litter is then transported through aperture 16 of rear wall 12 as previously described. Segments 142 are interconnected to a shaft 150 that is rotated through the operation of a motor 152. Shaft 150 translates through cylinder 12 through the operation of a pinion 154 mounted to shaft 150 which translates along a rack 156.

Segments 142 are interconnected such that as segment 158 is rotated through the operation of shaft 150, all other segments 142 are sequentially rotated about shaft 150 to form a spiral which unfolds from the position illustrated at 144 to the position illustrated at 146.

It therefore can be seen that the present invention provides for a self cleaning litter system for the automatic separation of animal waste from particulate litter which is simple in operation, maintenance free and which requires essentially no attention during normal operation. The present invention exhibits good reliability as well as reduced cost of operation over previously developed litter systems.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A litter system comprising:
    a chamber for containing a quantity of particulate litter, said chamber having a front wall and a rear wall, said front wall thereof including an aperture providing an entry way to said chamber for an animal;
    a helical shaped screen disposed within said chamber and extending from adjacent said front wall to adjacent said rear wall for separating the litter from animal waste and for transporting the animal waste through said chamber; and
    means for rotating said chamber, such that animal waste is transported through said chamber as said chamber rotates.

2. The litter system of claim 1 wherein said chamber comprises a cylinder and said screen is interconnected to interior walls of said cylinder.

3. The litter system of claim 1 wherein said rear wall includes an aperture and a funnel shaped chute interconnected to said rear wall adjacent said rear wall aperture for discharging the animal waste from said chamber.

4. The litter system of claim 3 and further including:
    a receptacle for receiving animal waste discharged through said chute.

5. The litter system of claim 4 wherein said receptacle includes a disposable bag and means for mounting said disposable bag adjacent said chute.

6. The litter system of claim 5 wherein said mounting means includes means for maintaining said disposable bag in an open position and a normally closed cover for closing said disposable bag, said cover being self opening upon animal waste being discharged from said chute.

7. The litter system of claim 1 and further including:
    a funnel disposed adjacent said front wall and circumferentially around said entry way for facilitating removal of particulate litter from said chamber.

8. The litter system of claim 1 wherein said front wall includes means for attaching a receptacle bag for collecting particulate litter from said chamber.

9. The litter system of claim 1 wherein said means for rotating said chamber includes:
    means for supporting said chamber for rotational movement therein;
    a drive belt circumferentially mounted to said chamber; and
    motor means for engaging said drive belt for rotating said chamber within said support means.

10. The litter system of claim 9 and further including:
    means for controlling said motor means for deenergizing said motor means after said chamber has rotated a predetermined number of rotations and for positioning said chamber at a predetermined position after said motor means is deenergized.

11. The litter system of claim 10 wherein said control means includes a Hall effect sensor.

12. A litter system comprising:
    a cylindrical chamber having first and second ends and a side wall for containing a quantity of particulate litter, said chamber having a front wall and a rear wall, corresponding to said first and second ends thereof, respectively;
    said chamber front wall including an aperture providing an entry way to said chamber for an animal;
    said chamber rear wall including a centrally disposed aperture;
    a helical shaped screen having first and second ends and disposed within said cylindrical chamber and adjacent to said side wall, said first end disposed adjacent to said front wall and said second end disposed adjacent to said rear wall for separating the particulate litter from animal waste and for transporting the animal waste through said cylindrical chamber;
    means disposed between said second end of said screen and said rear wall aperture for lifting the animal waste from said screen through said rear wall aperture; and
    means for rotating said chamber, such that the animal waste is transported through said chamber as said chamber rotates.

13. The litter system of claim 12 wherein said lifting means includes:
    a spiral shaped screen having an axis parallel to the axis of said chamber; and
    a funnel centrally disposed within said spiral shaped screen and aligned with said rear wall aperture.

14. The litter system of claim 12 and further including:
    a receptacle including a disposable bag for receiving the animal waste passing through said rear wall aperture, said receptacle including means for mounting to said chamber said disposable bag in a normally open position and a cover having an open and closed position, said cover being normally closed over said disposable bag, and movable to said open position upon discharge of the animal waste from said rear wall aperture for receipt by said disposable bag.

15. The litter system of claim 12 and further including:
    a funnel disposed adjacent said front wall and circumferentially around said entry way; and
    means for attaching a receptacle to said front wall around said front wall aperture for facilitating removal of the particulate litter from said chamber.

16. The litter system of claim 12 wherein said means for rotating said chamber includes:
    means for supporting said chamber for rotational movement therein;
    a drive belt circumferentially mounted to said chamber; and
    motor means for engaging said drive belt for rotating said chamber within said support means.

17. The litter system of claim 16 and further including:
 means for controlling said motor means for deenergizing said motor means after said chamber has rotated a predetermined number of rotations and for positioning said chamber at a predetermined position after said motor means is deenergized.

18. The litter system of claim 17 wherein said control means includes a Hall effect sensor.

19. The litter system of claim 12 wherein said helical shaped screen includes a plurality of interconnected segments movable within said chamber between a collapsed position and an extended position, such that upon rotation of said segments, said segments move to said extended position forming a spiral within said chamber for separating the particulate litter from the animal waste while simultaneously transporting the animal waste through said chamber.

* * * * *